(12) United States Patent
Yamashita

(10) Patent No.: US 9,013,050 B2
(45) Date of Patent: Apr. 21, 2015

(54) HYBRID CONSTRUCTION MACHINE

(71) Applicant: Kobelco Construction Machinery Co., Ltd., Hiroshima-shi (JP)

(72) Inventor: Koji Yamashita, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 67 days.

(21) Appl. No.: 14/016,468

(22) Filed: Sep. 3, 2013

(65) Prior Publication Data

US 2014/0062096 A1 Mar. 6, 2014

(30) Foreign Application Priority Data

Sep. 6, 2012 (JP) ................. 2012-195682

(51) Int. Cl.
| | |
|---|---|
| F02N 11/06 | (2006.01) |
| H02P 9/04 | (2006.01) |
| H02P 9/00 | (2006.01) |
| B60W 20/00 | (2006.01) |
| B60K 6/485 | (2007.10) |
| B60W 10/06 | (2006.01) |
| B60W 10/08 | (2006.01) |
| B60W 10/30 | (2006.01) |

(52) U.S. Cl.
CPC ............. *H02P 9/00* (2013.01); *B60W 20/1088* (2013.01); *B60K 6/485* (2013.01); *B60W 10/06* (2013.01); *B60W 10/08* (2013.01); *B60W 10/30* (2013.01); *Y02T 10/6286* (2013.01); *Y02T 10/6226* (2013.01)

(58) Field of Classification Search
USPC ............... 290/40 R; 60/414, 431; 701/22, 50; 37/348
See application file for complete search history.

(56) References Cited

U.S. PATENT DOCUMENTS

| | | | | | |
|---|---|---|---|---|---|
| 4,476,679 | A | * | 10/1984 | Sato | 60/434 |
| 5,056,312 | A | * | 10/1991 | Hirata et al. | 60/426 |
| 5,307,631 | A | * | 5/1994 | Tatsumi et al. | 60/452 |
| 5,613,361 | A | * | 3/1997 | Dantlgraber et al. | 60/427 |
| 5,638,677 | A | * | 6/1997 | Hosono et al. | 60/431 |
| 6,020,651 | A | * | 2/2000 | Nakamura et al. | 290/40 R |
| 6,055,851 | A | * | 5/2000 | Tanaka et al. | 73/46 |
| 6,127,813 | A | * | 10/2000 | Tamagawa | 322/16 |

(Continued)

FOREIGN PATENT DOCUMENTS

JP 2009-216058 9/2009

*Primary Examiner* — Pedro J Cuevas
(74) *Attorney, Agent, or Firm* — Oblon, McClelland, Maier & Neustadt, L.L.P.

(57) ABSTRACT

Provided is a hybrid construction machine including: a hydraulic actuator; a hydraulic pump which discharges hydraulic fluid for driving the hydraulic actuator; a generator-motor which performs an electric generator action of generating electric power and an electric motor action of generating motive power; an engine connected to the hydraulic pump and the motor-generator; an electrical storage device; and a controller which causes the generator-motor to perform the electric generator action and charge the electrical storage device and causes the generator-motor to perform the electric motor action by electric power discharged from the electrical storage device to assist the engine. The controller causes the generator-motor to start the electric generator action when an engine output becomes equal to or greater than a predetermined engine lower limit output, and controls the electric generator action to keep the engine output no lower than the engine lower limit output.

5 Claims, 3 Drawing Sheets

(56) References Cited

U.S. PATENT DOCUMENTS

| | | | |
|---|---|---|---|
| 6,349,252 B1* | 2/2002 | Imanishi et al. | 701/50 |
| 6,666,022 B1* | 12/2003 | Yoshimatsu et al. | 60/413 |
| 6,708,787 B2* | 3/2004 | Naruse et al. | 180/53.8 |
| 6,725,581 B2* | 4/2004 | Naruse et al. | 37/348 |
| 6,735,486 B2* | 5/2004 | Hoffelmeyer et al. | 700/80 |
| 6,789,335 B1* | 9/2004 | Kinugawa et al. | 37/348 |
| 6,820,356 B2* | 11/2004 | Naruse et al. | 37/348 |
| 6,851,207 B2* | 2/2005 | Yoshimatsu | 37/348 |
| 7,086,226 B2* | 8/2006 | Oguri | 60/414 |
| 7,520,935 B2* | 4/2009 | Fellinger | 118/308 |
| 7,525,206 B2* | 4/2009 | Kagoshima et al. | 290/40 C |
| 7,565,801 B2* | 7/2009 | Tozawa et al. | 60/414 |
| 7,596,893 B2* | 10/2009 | Tozawa et al. | 37/348 |
| 7,669,413 B2* | 3/2010 | Komiyama et al. | 60/414 |
| 7,742,272 B2* | 6/2010 | Kubo et al. | 361/159 |
| 7,788,915 B2* | 9/2010 | Shiozaki et al. | 60/413 |
| 7,964,246 B2* | 6/2011 | Fellinger | 427/421.1 |
| 7,980,073 B2* | 7/2011 | Jensen | 60/414 |
| 8,006,491 B2* | 8/2011 | Narazaki et al. | 60/452 |
| 8,136,271 B2* | 3/2012 | Sakai et al. | 37/348 |
| 8,190,334 B2* | 5/2012 | Kagoshima et al. | 701/50 |
| 8,214,110 B2* | 7/2012 | Morinaga et al. | 701/50 |
| 8,285,434 B2* | 10/2012 | Yanagisawa et al. | 701/22 |
| 8,286,740 B2* | 10/2012 | Kagoshima et al. | 180/65.27 |
| 8,421,415 B2* | 4/2013 | Kagoshima | 320/132 |
| 8,468,816 B2* | 6/2013 | Sora | 60/414 |
| 8,505,287 B1* | 8/2013 | Babbitt et al. | 60/327 |
| 8,532,855 B2* | 9/2013 | Koga et al. | 701/22 |
| 8,534,264 B2* | 9/2013 | Kawaguchi et al. | 123/350 |
| 8,606,448 B2* | 12/2013 | Anders et al. | 701/22 |
| 8,634,977 B2* | 1/2014 | Koide | 701/22 |
| 8,659,177 B2* | 2/2014 | Fujishima et al. | 290/1 R |
| 8,700,275 B2* | 4/2014 | Edamura et al. | 701/50 |
| 8,739,906 B2* | 6/2014 | Kawashima | 180/65.22 |
| 8,775,033 B2* | 7/2014 | Magaki et al. | 701/50 |
| 8,875,820 B2* | 11/2014 | Yamashita | 180/65.265 |
| 8,909,434 B2* | 12/2014 | Anders et al. | 701/50 |
| 2003/0221339 A1* | 12/2003 | Naruse et al. | 37/348 |
| 2004/0148817 A1* | 8/2004 | Kagoshima et al. | 37/348 |
| 2005/0246082 A1* | 11/2005 | Miki et al. | 701/50 |
| 2007/0214782 A1* | 9/2007 | Komiyama et al. | 60/431 |
| 2008/0068772 A1* | 3/2008 | Kubo et al. | 361/159 |
| 2008/0072588 A1* | 3/2008 | Ariga et al. | 60/449 |
| 2008/0093864 A1* | 4/2008 | Kagoshima et al. | 290/40 A |
| 2008/0104952 A1* | 5/2008 | Shiozaki et al. | 60/413 |
| 2008/0121448 A1* | 5/2008 | Betz et al. | 180/65.3 |
| 2008/0177434 A1* | 7/2008 | Moran | 701/22 |
| 2008/0201045 A1* | 8/2008 | Kagoshima et al. | 701/50 |
| 2008/0314038 A1* | 12/2008 | Tozawa et al. | 60/414 |
| 2009/0173174 A1* | 7/2009 | Fellinger | 74/11 |
| 2009/0320461 A1* | 12/2009 | Morinaga et al. | 60/431 |
| 2010/0031650 A1* | 2/2010 | Morinaga et al. | 60/459 |
| 2010/0102763 A1* | 4/2010 | Kagoshima et al. | 318/380 |
| 2010/0280697 A1* | 11/2010 | Yanagisawa et al. | 701/22 |
| 2011/0071739 A1* | 3/2011 | Sano et al. | 701/50 |
| 2011/0098873 A1* | 4/2011 | Koga et al. | 701/22 |
| 2011/0167811 A1* | 7/2011 | Kawaguchi et al. | 60/395 |
| 2011/0251746 A1* | 10/2011 | Wu et al. | 701/22 |
| 2012/0109472 A1* | 5/2012 | Yanagisawa | 701/50 |
| 2012/0130576 A1* | 5/2012 | Sugiyama et al. | 701/22 |
| 2013/0134807 A1* | 5/2013 | Murata et al. | 310/52 |
| 2013/0299256 A1* | 11/2013 | Yamashita | 180/68.1 |
| 2013/0300128 A1* | 11/2013 | Fujishima et al. | 290/1 R |
| 2013/0325235 A1* | 12/2013 | Kurikuma et al. | 701/22 |
| 2014/0046552 A1* | 2/2014 | Tsuruga et al. | 701/50 |
| 2014/0052350 A1* | 2/2014 | Tsuruga et al. | 701/50 |
| 2014/0090367 A1* | 4/2014 | Hijikata et al. | 60/414 |
| 2014/0148984 A1* | 5/2014 | Nishi et al. | 701/22 |
| 2014/0182279 A1* | 7/2014 | Wu | 60/327 |
| 2014/0183876 A1* | 7/2014 | Yamashita et al. | 290/36 R |
| 2014/0214250 A1* | 7/2014 | Murakami et al. | 701/22 |
| 2014/0277970 A1* | 9/2014 | Sakamoto et al. | 701/50 |
| 2014/0283509 A1* | 9/2014 | Hijikata | 60/414 |

* cited by examiner

HYBRID CONSTRUCTION MACHINE

BACKGROUND OF THE INVENTION

1. Technical Field

The present invention relates to a hybrid construction machine which makes combined use of motive power of an engine and electric power of an electrical storage device.

2. Related Art

The background art of the present invention is described below by taking an excavator as an example.

A general excavator includes: a lower travel body of a crawler type, an upper slewing body provided on the lower travel body so as to be slewable about an axis perpendicular to the ground surface; a working attachment attached to the upper slewing body; a hydraulic actuator; a hydraulic pump which discharges hydraulic fluid for driving the hydraulic actuator; and an engine as a drive source. The hydraulic excavator also includes a generator-motor connected to the engine to perform an electric generator action and an electric motor action; and an electrical storage device which is charged by electric power generated by the electric generator action of the generator-motor. The generator-motor is driven by stored electric power, which is power stored in the electrical storage device, to perform the electric motor action, thereby assisting the engine in driving the hydraulic pump.

The output of the generator-motor is controlled to establish the following respective relationships on the relationship between the output of the engine, the required pump output which is an output required of the hydraulic pump, and the output of the generator-motor (the electric motor output or the generator output):

upon charging, the engine output is equal to the generator output plus the required pump output; and upon assisting, the engine output plus the electric motor output is equal to the required pump output.

In other words, when the required pump output exceeds the engine output, the output of the generator-motor is controlled so as to make up the shortfall in the engine output by the electric motor output; meanwhile, when the required pump output is lower than the engine output, the output of the generator-motor is controlled so as to charge the electrical storage device by the generator output corresponding to the excess of the engine output.

In this hybrid excavator, with increase in the hydraulic load (required pump output), the fuel flow rate (supply volume) is increased to increase the engine output. In this case, the large rate of the increase in the engine output (the amount of change in the output per unit time) makes the fuel flow rate excessively large to cause incomplete combustion, thus deteriorating the combustion in the engine, for instance, involving black smoke. As means for resolving this problem, Japanese Patent Application Publication No. 2009-216058 discloses technology of limiting the rate of increase in the engine output to a specific limit value. Specifically, according to this prior art, when the required pump output exceeds the upper output limit of the engine as set by the limit value, performed is keeping the engine output at the upper output limit of the engine by causing the generator-motor to perform an electric motor action (assist) using electric power discharged from an electrical storage device.

However, the assistance power of the generator-motor depends on the stored electric power of the electrical storage device and the stored electric power varies with the charge rate and the like; this generates a possibility of an assistance shortfall resulting from limitations of the stored electric power, the shortfall preventing the rate of the increase in the engine output from being restricted to the limit value. In short, the prior art technology of limiting the rate of the increase in the engine output may fail to achieve the object of preventing the combustion from deterioration.

SUMMARY OF THE INVENTION

It is an object of the present invention to provide a hybrid construction machine which is capable of more reliably preventing the combustion in an engine from deterioration involved by increase in the required pump output. The hybrid construction machine provided by the present invention includes: a hydraulic actuator; a hydraulic pump which discharges hydraulic fluid for driving the hydraulic actuator; a generator-motor which performs an electric generator action to generate electric power and performs an electric motor action to generate motive power; an engine connected to the hydraulic pump and the motor-generator; an electrical storage device; and a controller which makes the generator-motor perform the electric generator action to charge the electrical storage device and makes the generator-motor perform the electric motor action by electric power discharged from the electrical storage device to assist the engine. The controller is adapted to cause the generator-motor to start performing the electric generator action at the time when an output of the engine becomes equal to or greater than a predetermined engine lower limit output and to control the electric generator action of the generator-motor to keep the engine output in a range of no lower than the engine lower limit output.

EMBODIMENTS OF THE INVENTION

There will be explained an embodiment of the present invention with reference to the drawings. In this embodiment, the present invention is applied to a hybrid excavator.

Figure 1:
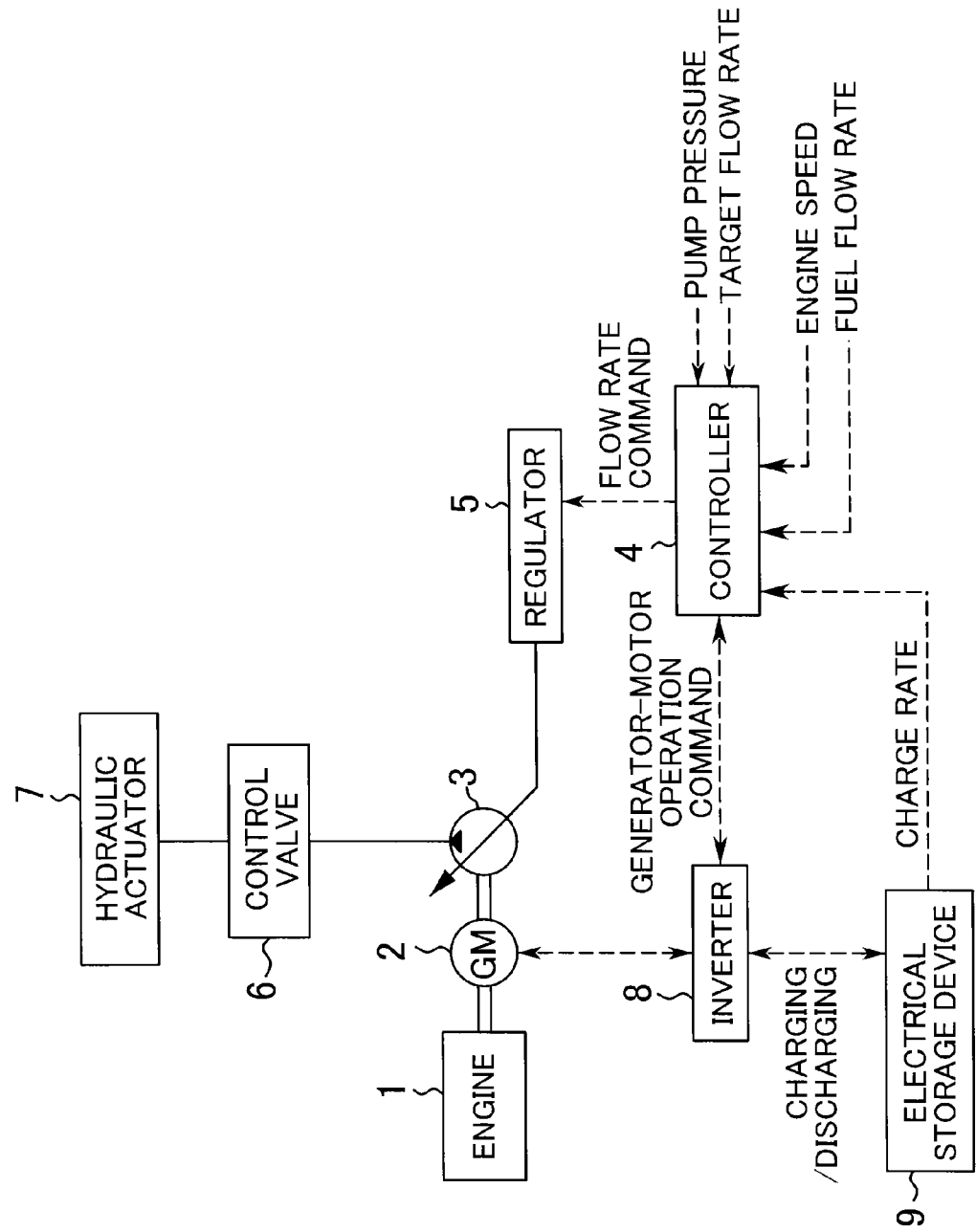
FIG. 1 is a block diagram showing the main constituent elements of a hybrid construction machine relating to an embodiment of the present invention.

As shown in FIG. 1, the hybrid construction machine relating to this embodiment includes: an engine 1, a generator-motor 2, a hydraulic pump 3, a controller 4, a regulator 5, a control valve 6, a hydraulic actuator 7, an inverter 8 and an electrical storage device 9.

The generator-motor 2 is connected to the engine 1 to perform an electric generator action (an action of generating electric power to charge the electrical storage device) and an electric motor action (an action of generating motive power to assist the engine 1 in driving the hydraulic pump 3). There are known a so-called parallel system and a series system as a system for supplying power to the hydraulic pump 3 in the hybrid excavator, wherein the present invention can be applied to either of the systems.

The hydraulic pump 3, which is constituted by a variable-displacement hydraulic pump in this embodiment, is connected to the engine 1. The regulator 5 is adapted to change the discharge amount of the hydraulic pump 3 by altering the tilt of the hydraulic pump 3, and the action of the regulator 5 is controlled by the controller 4. The hydraulic fluid discharged from the hydraulic pump 3 is supplied to the hydraulic actuator 7 via the control valve 6, which is operated by a not-graphically-shown remote control valve. In FIG. 1, only one hydraulic actuator 7 is depicted, for the sake of simplicity, while there are actually provided a plurality of hydraulic actuators: for example, a boom cylinder, an arm cylinder, a bucket cylinder, a travel hydraulic motor, and the like.

The generator-motor 2 is connected to the electrical storage device 9 via the inverter 8. The inverter 8 carries out: switching of the generator-motor 2 between an electric generator action and an electric motor action; control of the output current of the generator-motor 2 performing an electric generator action; control of the output torque of the generator-motor 2 performing an electric motor action; and control of charge and discharge of the electrical storage device 9 in accordance with the generator output, which is an output of the generator-motor 2 performing the electric generator action.

This hybrid construction machine is provided with a plurality of not-graphically-shown detectors. These detectors determine an operation amount of the remote control valve, the pump pressure which is a discharge pressure of the hydraulic pump 3, the charge rate of the electrical storage device 9, the engine speed, i.e., engine rotational speed, and the fuel supply to the engine 1 (the fuel flow rate), respectively, and send the information thereof to the controller 4.

Figure 2:
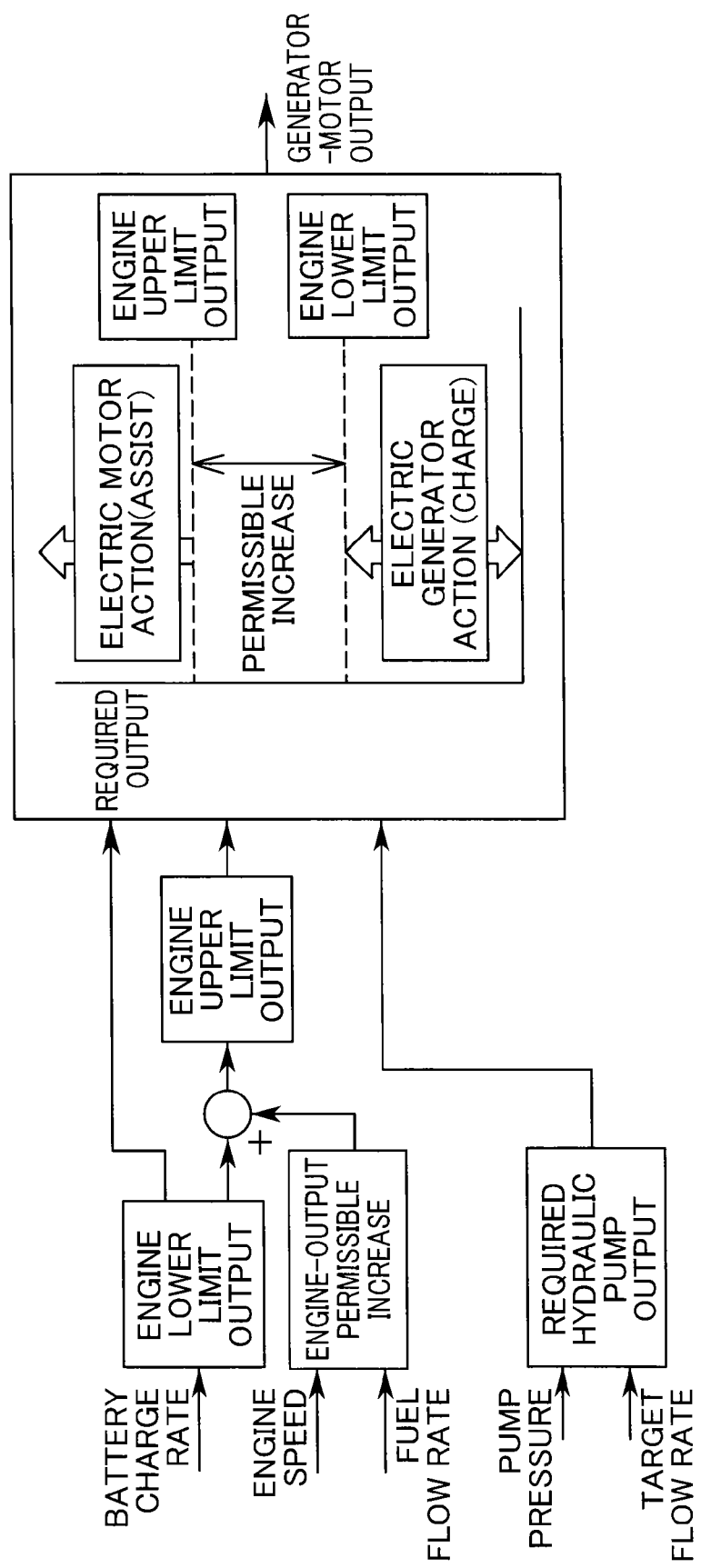
FIG. 2 is a block line diagram showing calculation and control details of the controller shown in FIG. 1.

The controller 4 carries out the calculation and control operations shown in FIG. 2, that is:

(i) calculation of an engine lower limit output based on the charge rate of the electrical storage device 9;

(ii) calculation of the required pump output based on a target flow rate of the hydraulic pump 3 and the pump pressure, the target flow rate being determined by the amount of operation of the remote control valve;

(iii) calculation of an engine-output permissible increase based on the engine speed and the fuel flow rate;

(iv) calculation of an engine upper limit output by adding the engine-output permissible increase to the engine lower limit output; and (v) control of the output of the generator-motor 2 (the generator output and the motor output) based on the calculation values described above. The details of these control steps are as follows.

(I) Engine Lower Limit Output

Figure 3:
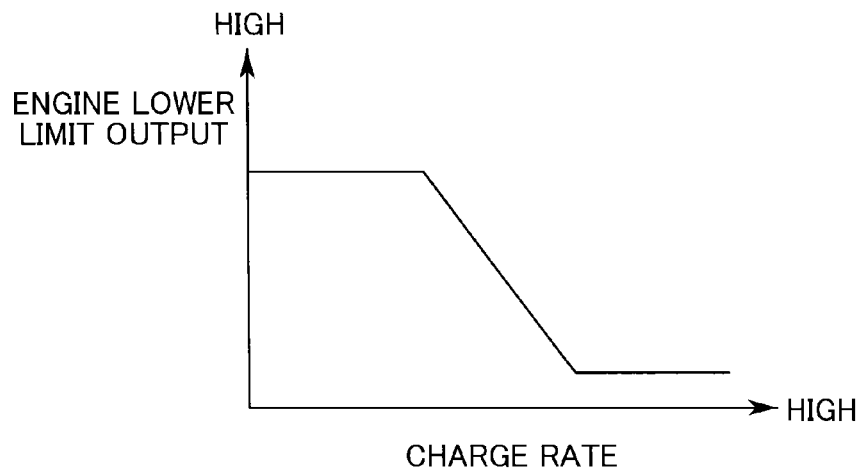
FIG. 3 is a diagram showing a relationship between a charge rate of an electrical storage device and an engine lower limit output, which is stored in the controller.

FIG. 3 shows a predetermined map of the relationship between the charge rate of the electrical storage device 9 and the engine lower limit output. For the purpose of suppressing deterioration by reducing the charging frequency of the electrical storage device 9 to thereby improve the lifespan of the electrical storage device 9, and with a view that the high charge rate reduces the need for charging thereof, the relationship shown in FIG. 3 is previously set as a map and stored in the controller 4. According to this map, the engine lower limit output is set in accordance with the charge rate of the electrical storage device, specifically, so as to be set to a lower value in accordance with the higher charge rate.

(II) Engine-Output Permissible Increase

Figure 4:
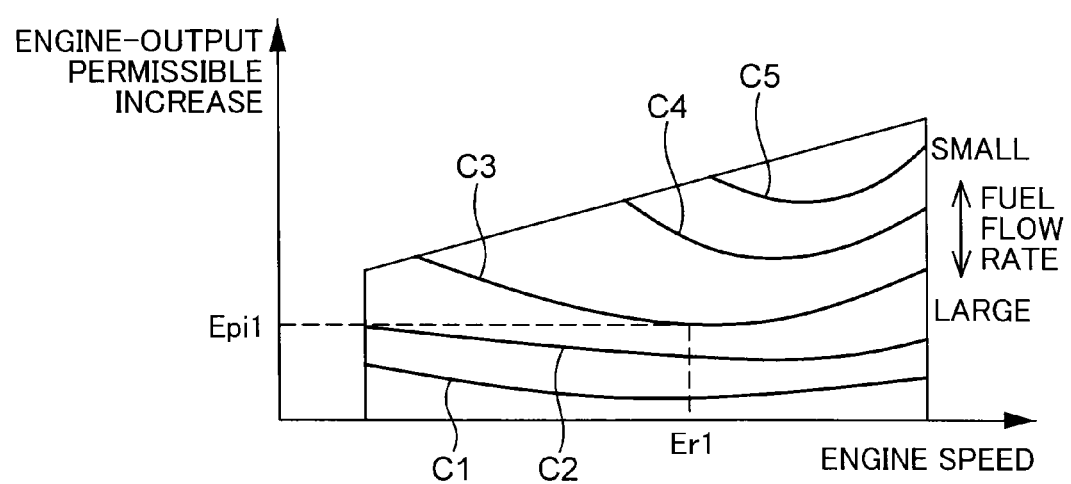
FIG. 4 is a diagram showing a relationship between an engine speed, a fuel flow rate and an engine-output permissible increase, the relationship stored in the controller.

FIG. 4 shows a map in which the engine output permissible increase is added to the engine characteristics indicating the relationship between the engine speed and the fuel flow rate, the map being set and stored in advance in the controller 4. Respective five curves C1 to C5 designated by the thick lines in FIG. 4 indicate the relationship between the engine speed and the engine output permissible increase which is set for different fuel flow rates, wherein the higher positioned curve indicates the relationship set for lower fuel flow rate; specifically, the highest curve C1 of the five curves C1 to C5 indicates one set for the lowest fuel flow rate, while the lowest curve C5 indicates one set for the highest fuel flow rate.

The controller 4 calculates the engine output permissible increase from the determined engine speed and fuel flow rate, on the basis of the map shown in FIG. 4. For example, in the case of the engine speed Er1 and the fuel flow rate corresponding to the third curve C3 from the top in FIG. 4, the engine output permissible increase is Epi1. Thus, for a fixed engine speed, a small fuel flow rate allows a larger engine output permissible increase to be set, because the quality of the combustion in the engine is governed by the engine speed and the fuel flow rate (for example, the higher fuel flow rate is more likely to allow the combustion in the engine to be deteriorated, even at the same engine speed).

(III) Engine Upper Limit Output

The controller 4 calculates the engine upper limit output by adding the engine output permissible increase calculated in (II) above to the engine lower limit output.

(IV) Required Pump Output

The controller 4 calculates a target flow rate on the basis of the determined pump pressure and the operation amount of the remote control valve, and, on the basis of this target flow rate, calculates the required-pump-output, that is, an output required of the hydraulic pump 3.

On the basis of the thus calculated engine lower limit and upper limit output, the controller 4 controls the generator-motor 2. Specifically, in the case of the required pump output in a range no greater than the engine lower limit output, the controller 4 causes the generator-motor 2 to perform an electric generator action to charge the electrical storage device 9; in the case of the required pump output in a range no lower than the engine upper limit output, the controller 4 causes the generator-motor 2 to perform an electric motor action to assist the engine 1; and in the case of the required pump output in a range between the engine lower limit output and the engine upper limit output, the controller 4 sets the output of the generator-motor 2 to zero. The controller 4 thus controls the output of the generator-motor 2 (the generator output or the motor output) so as to keep the required pump output within a range between the engine lower limit output and the engine upper limit output.

This hybrid construction machine enables the following beneficial effects to be obtained.

(A) The controller 4 controls the electric generator action of the generator-motor 2 so as to keep the engine lower limit output, which is the basis of the increase in the engine output and set in advance; this makes it possible to restrict the amount of the increase (range of change) in the engine output, as the fundamental beneficial effect.

(B) Moreover, the engine upper limit output is also set in addition to the engine lower limit output, and the controller 4 controls the generator-motor 2 so as to keep the engine output in a range between the engine lower limit output and the engine upper limit output; this allows the increase in the engine output to be further restricted. These beneficial effects (A) and (B) make it possible to restrain the fuel supply from increase to thereby keep well the combustion in the engine.

(C) The engine output permissible increase, which is the amount of increase permissible in the engine output, is set, and the engine upper limit output is calculated by adding the engine output permissible increase to the engine lower limit output; this allows the increase in the engine output to be restricted to the value no more than the engine output permissible increase, thereby further enhancing the combustion-deterioration-prevention effect.

(D) In the view that the higher fuel flow rate is more likely to allow the combustion in the engine to be deteriorated due to increase in the engine output, the engine output permissible increase is set to a smaller value in accordance with the higher fuel flow rate, which further enhances the combustion-deterioration-prevention effect.

(E) The engine lower limit output is set in accordance with the charge rate of the electrical storage device 9, specifically, is set to a lower value as the charge rate becomes higher; this enables the charging frequency of the electrical storage device 9 to be restricted, thus to improve the lifespan of the electrical storage device 9.

The present invention is, however, not limited to the embodiments described above, but may include the following embodiments.

(1) The engine lower limit output, while being modified in accordance with the charge rate of the electrical storage device in the above-mentioned embodiments, may be set variably in relation to other factors, independently of the charge rate of the electrical storage device, or may be fixed to a uniform value.

(2) As to the engine output, the above embodiments includes setting both of the engine lower limit output and the engine upper limit output; meanwhile, the present invention may include setting only the engine lower limit output which is the base of the increase in the engine output.

(3) In the case of setting the engine upper limit output, the determination of the engine output permissible increase for determining the engine upper limit output is not limited to one based on a map indicating a relationship between the engine speed and the fuel flow rate, as in the embodiment described above; this engine output permissible increase, alternatively, may be fixed to a uniform value.

(4) The present invention can also be applied to a hybrid construction machine other than a hybrid excavator.

As described up to this, the present invention provides a hybrid construction machine capable of more reliably preventing the combustion in an engine from deterioration due to increase in the required pump output. The hybrid construction machine provided by the present invention includes: a hydraulic actuator; a hydraulic pump which discharges hydraulic fluid for driving the hydraulic actuator; a generator-motor which performs an electric generator action of generating electric power and performs an electric motor action of generating motive power; an engine connected to the hydraulic pump and the motor-generator; an electrical storage device; and a controller which causes the generator-motor to perform the electric generator action and charge the electrical storage device and causes the generator-motor to perform the electric motor action by electric power discharged from the electrical storage device to assist the engine. The controller causes the generator-motor to start the electric generator action at the time when an output of the engine becomes equal to or greater than a predetermined engine lower limit output, and controls the electric generator action of the generator-motor so as to keep the engine output in a range of no lower than the engine lower limit output.

According to this, the engine lower limit output which is the base for increase in the engine output is previously set and the controller controls the electric generator action of the generator-motor so as to keep the engine output in a range of no lower than the engine lower limit output; this allows the amount of increase (range of change) in the engine output to be restricted, thereby restricting the increase in the fuel supply to keep well the combustion in the engine.

In the present invention, the controller preferably sets the engine lower limit output in accordance with a charge rate of the electrical storage device and sets the engine lower limit output to a lower value as the charge rate reduces higher. Since the high charge rate of the electrical storage device makes the need for charging low, setting the engine lower limit output to a lower value in accordance with the higher charge rate restrains the electrical storage device from unnecessary charge to thereby improve the lifespan thereof.

Besides, the controller preferably sets an engine upper limit output higher than the engine lower limit output, causes the generator-motor to perform the electric motor action when the engine output is greater than the engine upper limit output, and controls the electric motor action of the generator-motor so as to keep the engine output in a range of no more than the engine upper limit output. Thus keeping the engine output in a range of not only no lower than the engine lower limit output but also no more than the engine upper limit allows the increase in the engine output to be further restricted. This enhances the beneficial effect of restricting the fuel supply to keep well the combustion in the engine.

In this case, it is preferable that the controller sets an engine output permissible increase as an amount of increase permissible in the engine output, and calculates the engine upper limit output by adding the engine output permissible increase to the engine lower limit output. This allows the increase in the engine output to be restricted to no more than the permissible increase. Consequently, setting the engine output permissible increase to a suitable value in relation to the combustion state in the engine enables the combustion-deterioration-prevention effect to be further enhanced.

Besides, it is preferable that the controller previously stores a map set in respect of a relationship between an engine speed, a fuel flow rate and the engine-output permissible increase, and sets the engine output permissible increase to a larger value, for a fixed engine speed, as the fuel flow rate becomes smaller, on the basis of the map. Since the greater fuel flow rate is more likely to allow the combustion in the engine to be deteriorated due to increase in the engine output (on contrary, the smaller fuel flow rate is less likely to allow the combustion in the engine to be deteriorated), setting the engine output permissible increase to a smaller value in accordance with the higher fuel flow rate allows the effect of suppressing combustion-deterioration to be enhanced.

This application is based on Japanese Patent application No. 2012-195682 filed in Japan Patent Office on Sep. 6, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A hybrid construction machine, comprising:
a hydraulic actuator;
a hydraulic pump which discharges hydraulic fluid for driving the hydraulic actuator;
a generator-motor which performs an electric generator action of generating electric power and performs an electric motor action of generating motive power;
an engine connected to the hydraulic pump and the motor-generator;
an electrical storage device; and
a controller which causes the generator-motor to perform the electric generator action to charge the electrical storage device and causes the generator-motor to perform the electric motor action by electric power discharged from the electrical storage device to assist the engine, wherein the controller causes the generator-motor to start the electric generator action at the time when an output of the engine is equal to or greater than a predetermined engine lower limit output, and controls the electric generator action of the generator-motor so as to keep the engine output in a range of no lower than the engine lower limit output.

2. The hybrid construction machine according to claim 1, wherein the controller sets the engine lower limit output in accordance with a charge rate of the electrical storage device and sets the engine lower limit output to a lower value in accordance with the higher charge rate.

3. The hybrid construction machine according to claim 1, wherein the controller sets an engine upper limit output higher than the engine lower limit output, causes the generator-motor to perform the electric motor action when the engine output is greater than the engine upper limit output, and controls the electric motor action of the generator-motor so as to keep the engine output in a range of no more than the engine upper limit output.

4. The hybrid construction machine according to claim 3, wherein the controller sets an engine-output permissible increase as an amount of increase permissible in the engine output, and calculates the engine upper limit output by adding the engine output permissible increase to the engine lower limit output.

5. The hybrid construction machine according to claim 4, wherein the controller previously stores a map set in respect of a relationship between an engine speed, a fuel flow rate and the engine output permissible increase, and sets the engine output permissible increase to a larger value, for a fixed engine speed, in accordance with the smaller fuel flow rate, on the basis of the map.

* * * * *